June 26, 1956  F. A. JANOUSEK  2,752,011
FISHING REEL BRAKE
Filed Oct. 15, 1952
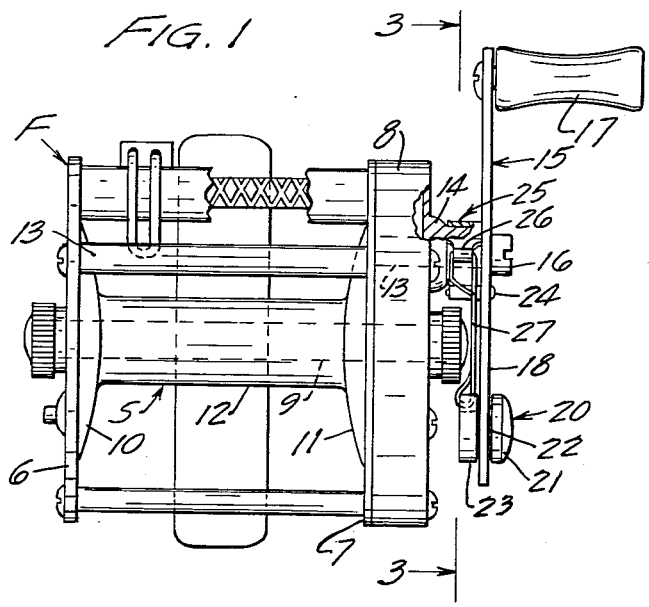
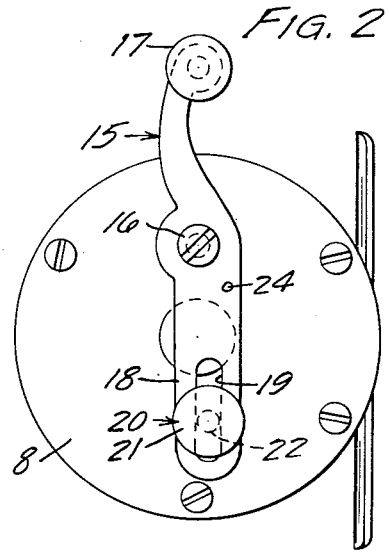
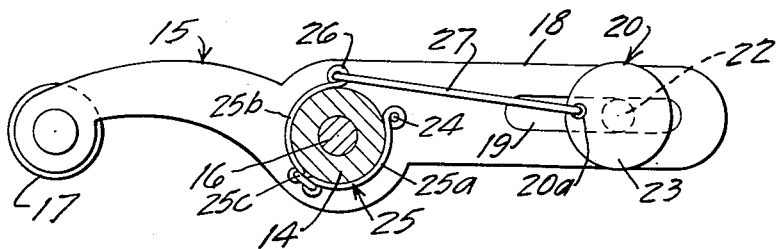
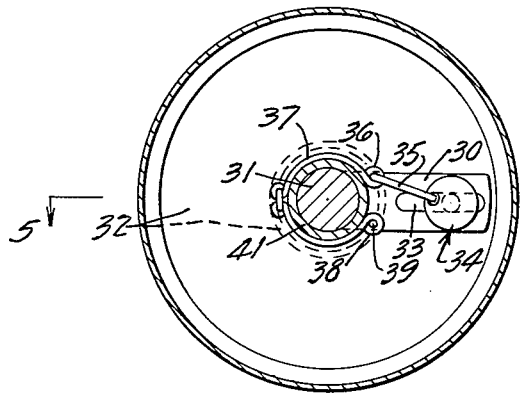
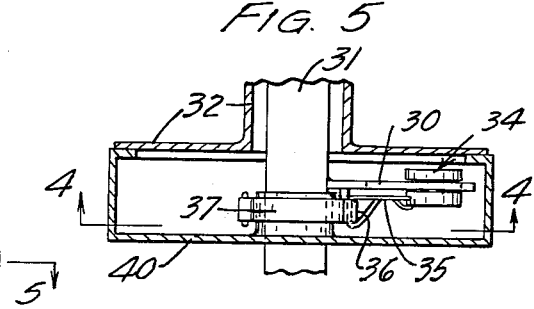
INVENTOR
FRANK A. JANOUSEK
BY Williamson, Williamson, Schroeder & Adams
ATTORNEYS

United States Patent Office 2,752,011
Patented June 26, 1956

2,752,011

FISHING REEL BRAKE

Frank A. Janousek, Hutchinson, Minn.

Application October 15, 1952, Serial No. 314,873

1 Claim. (Cl. 188—186)

This invention relates to fishing reels. More particularly, it relates to fishing reels constructed to prevent backlash action during casting operations.

Various types of reels have been designed in an attempt to eliminate the backlash problem for relatively inexperienced casters and to obviate the need for "thumbing" the reel by experienced casters. Most of these reels are either complicated and expensive to manufacture, costly, subject to excessive wear within a short period, do not apply the retardation gradually throughout the casting operation, have an excessive number of parts, or require individual settings for each casting plug of different weight utilized. Most of them require the backlash mechanism to be built into the reel at the time of manufacture and cannot be readily applied to the thousands of reels already owned by fishermen. My invention is directed toward obviating these objectionable features.

It is a general object of my invention to provide a novel and improved fishing reel with an anti-backlash mechanism of cheap and simple manufacture and operation.

A more specific object is to provide an anti-backlash mechanism for fishing reels of cheap and simple manufacture and operation and which will perform with increased efficiency.

Another object is to provide an anti-backlash mechanism for fishing reels which can be either built into the reel at the time of manufacture or readily applied to existing reels without serious modification or reconstruction thereof.

Another object is to provide an anti-backlash mechanism which may be readily applied to fishing reels and which will function for extremely long periods of time without appreciable wear which would require replacement or repair.

Another object is to provide an anti-backlash mechanism for fishing reels which requires no setting for use with casting plugs of various weights.

Another object is to provide an anti-backlash mechanism for fishing reels which functions throughout the casting operation and increases and decreases the extent of retardation applied in direct accordance with the need therefor and throughout the entire casting operation from the very beginning thereof until the line ceases to pay out and the reel has stopped.

Another object is to provide an anti-backlash mechanism for fishing reels in which the degree of retardation applied is directly proportional to the need therefor and is not affected adversely by springs attached thereto.

These and other objects and advantages of my invention will more fully appear from the following description made in connection with the accompanying drawings, wherein like reference characters refer to the same or similar parts throughout the several views, and in which:

Fig. 1 is a front elevational view of a fishing reel adapted to be attached to a fishing rod and having one embodiment of my invention attached thereto;

Fig. 2 is an end elevational view of the same;

Fig. 3 is a sectional view taken along line 3—3 of Fig. 1 showing in detail the anti-backlash mechanism;

Fig. 4 is a more or less diagrammatic view showing the idea of the invention incorporated into the interior of the reel and applied directly to the shaft supporting the spool; and Fig. 5 is a sectional view taken approximately along line 5—5 of Fig. 4.

One embodiment of my invention, as shown in Figs. 1–3, may include a fishing reel frame indicated generally as F and being comprised of a pair of end plates 6 and 7 the latter forming with a cap 8 a housing for the driving mechanism (not shown). Rotatably mounted in the end plates 6 and 7 is a shaft 9 which has flanges 10 and 11 secured thereto adjacent its opposite ends and a drum member 12 between the flanges which together with the drum form a spool indicated generally as S. This spool is adapted to have the fish line wound therearound and to rotate with the shaft 9 during such winding or unwinding operations.

Rotatably mounted in the end plates 6 and 7 parallel to the shaft 9 is a countershaft 13. Adjacent one of its ends this countershaft 13 is supported by a portion of the frame which constitutes a bearing or boss 14 for the shaft and the shaft extends outwardly therebeyond a short distance. At the extreme outer end of this outwardly extending portion is a handle or crank member 15 secured to the countershaft 13 by a screw member 16 which extends through the medial portion of the handle or crank member as best shown in Fig. 3.

This handle or crank member has a turning knob 17 secured to one of its end portions and is secured by its medial portion to the countershaft 13. An arm 18 extends outwardly in the opposite direction to the portion of the crank which carries the knob, and this arm has a longitudinally extending slot 19 formed therein as best shown in Figs. 2 and 3. Mounted in the slot 19 is a weight 20 which is comprised of a head member 21 having a reduced portion 22 which extends through the slot and carries a washer 23 at the opposite side of the arm. The reduced portion may be swedged over to secure the washer to the head 21 and to permit the weight 20 to slide freely longitudinally of the slot and radially of the countershaft 13.

Secured to the inner side of the arm 18 as best shown in Fig. 3, is an inwardly extending pin 24. Mounted on this pin by one of its end portions is a brake band 25 which is formed of a thin strap of metal and in two sections 25a and 25b connected by a link 25c. This brake band 25 extends around the bearing 14 in position to engage the same and has a loop 26 formed at its other and free end. A link 27 formed of a relatively stiff wire connects this loop 26 to the weight 20 through an opening 20a provided therefor. The wire 27 rides backwardly and forwardly on the pin 24 as the weight 20 shifts inwardly and outwardly within the slot 19.

Fig. 4 shows another embodiment of my invention wherein the arm 30 is mounted on the shaft 31 which carries the spool 32. This arm is mounted on the portion of the shaft which extends within the housing at the end of the reel and between the end plate and the cap member as shown in Fig. 1. The arm has a slot 33 with a weight 34 similar to the weight 20 mounted therein for free sliding movement radially of the shaft 31. This weight 34 is connected by a link 35 to the free end 36 of a brake band 37 the other end 38 of which is anchored to a pin 39 which in turn is mounted upon the cap 40. The cap 40 carries a bearing 41 which helps to support the shaft 31 and acts as a surface to which the brake band may be secured. In other words, the brake band is positioned to encircle the bearing 41 and engage the same when tightened by outward movement of the weight 34.

In operation, the handle or crank member 15 is secured to the reel in substitution for the handle or crank member which normally comes with the reel. This can be accomplished by removing the screw 16, removing the original handle or crank member and substituting therefor the handle or crank member 15, thereafter securing the screw 16. At the beginning of each cast the speed of the spool S is relatively slow because there is a relatively large amount of line wound therearound which gives it a greater diameter than the spool itself, and hence the spool will turn relatively slowly in order to pay out the amount of line required by the speed of the casted plug. As the line passes out, however, the diameter of the outer surface thereof decreases so that the speed of the spool and hence the speed of the arm 15 increases. This is true because the arm 15 and the countershaft 13 are drivably connected with the shaft 9 in any of the conventional manners well-known in the art and found in most fishing reels today. As the speed of the arm increases, the centrifugal force exerted by the weight 20 increases therewith and the weight tends to move outwardly within the slot 19 toward the outer end of the arm 18. In so doing, the link 27 causes the brake band 25 to tighten around the bearing 14 and to thereby apply a braking effect against the rotation of the arm 18. The more rapidly the arm rotates the greater the braking action which will be applied thereto by the weight 20 and the brake band 25.

As the casted plug loses its speed and starts to descend, the line to which it is attached does not pay out as rapidly but the spool tends to continue at the relatively high speed which it has attained. This is the point of the casting operation at which the backlash normally occurs. It is imperative that at this point the maximum braking action be applied and the structure of my anti-backlash mechanism is such that this desirable feature is attained. Since it is at this point that the highest speed is reached by the spool, the greatest braking action is applied at this point of the casting operation by the brake band 25. Because the casting plug will be losing its speed there will be no further pull of the line and hence the effectiveness of the braking action will be increased so that immediately the speed of the spool will be decreased. As the speed of the rotating arm is decreased the centrifugal force is also decreased and this cuts down the braking action. If the braking action brings the spool speed down sufficiently far, the line will again exert a force upon the spool. During such action, of course, there is no danger of a backlash. Thus it can be seen that there is a constant balance of forces through the use of my device which insures that the maximum amount of braking action is applied when it is most needed and that as soon as it is no longer needed, the braking action is automatically decreased. It can also be seen that in the event further braking action is needed it will be immediately applied when required.

It should be noted that there is no spring action utilized in connection with the weight 20 and that this weight is capable of free and unhindered movement within the slot 19. Thus it can be seen that there is no need for the weight to overcome the effect of a spring and hence the braking action, although very slight, is initiated at the beginning of the cast. In other words, the braking action of my device need not first overcome the effect of a spring and does not go out of action and lose effect before the cast is completed as is the case in the use of springs. If a spring is applied to the centrifugal device it causes the effect of the centrifugal device to be terminated at the end of the cast before the cast is actually completed, and hence there is still danger of serious backlash. In my device the first effect of the centrifugal force is applied in the form of braking action and no effect of springs must be overcome or compensated for.

One of the advantages of my device is that it may be manufactured either as an attachment for the thousands of reels which are already in existence and owned by fishermen, or it may be manufactured as an integral part of a new reel. It is simple and cheap to manufacture and can be readily and easily applied by the most inexperienced owners. Also, it may be manufactured as an integral part of the reel separate from the handle as illustrated in Fig. 4. In fact, it may be manufactured as an attachment and applied by each and every fisherman himself to modify his existing reel without requiring him to purchase a new reel, thereby making the device especially advantageous. Because it is so simple and has so few parts, it can be manufactured and sold very cheaply.

It should also be noted that my anti-backlash mechanism requires no adjustment for casting plugs of different weights. Whatever adjustment is needed it provides automatically so that there is no need for adjustment and there is no need for "thumbing" of the reel during the casting operation. An entirely inexperienced caster can use a reel with my anti-backlash mechanism mounted thereon without fear and the aggravation of repeated backlashes.

Another advantage of my anti-backlash mechanism is that there is no appreciable wear involved which will require frequent replacements of the mechanism. There are no precision parts involved which would cause the mechanism to fail after a relatively short amount of wear and hence the cost of operation of the mechanism is practically nil.

It will, of course, be understood that various changes may be made in the form, details, arrangement and proportions of the various parts without departing from the scope of my invention.

What is claimed is:

In fishing reel braking apparatus, a frame, a shaft bearing on the frame and having a boss extending from the frame, a shaft in the bearing, a handle carried on the shaft to rotate the shaft, said handle extending outwardly from and substantially normally to the shaft, and said handle having a slot formed longitudinally therein, a weight slidably mounted in said slot for free movement therewithin and for rotation with said handle, a brake band encircling the boss, and linkage extending between said weight and said brake band to cause the latter to be tightened and frictionally engage the boss when said weight is moved away from the axis of rotation of the shaft by centrifugal force whereby the rotation of the shaft and the handle will be retarded proportionally to the speed of rotation of said arm.

References Cited in the file of this patent

UNITED STATES PATENTS

| | | |
|---|---|---|
| 1,347,529 | Wherry | July 27, 1920 |
| 1,851,718 | Merle | Mar. 29, 1932 |
| 2,489,447 | Borgstrom | Nov. 29, 1949 |
| 2,597,486 | Hockney | May 20, 1952 |
| 2,637,418 | Elliston | May 5, 1953 |

FOREIGN PATENTS

| | | |
|---|---|---|
| 2,739 | Great Britain | of 1878 |
| 383,387 | France | Jan. 7, 1908 |